March 28, 1950  J. M. WALKER  2,501,802
IGNITION COIL TESTER

Filed Nov. 19, 1947　　　　　　　　　　　　　2 Sheets-Sheet 1

Inventor
John M. Walker

By Clarence A. O'Brien
and Harvey B. Jackson
Attorneys

March 28, 1950      J. M. WALKER      2,501,802
IGNITION COIL TESTER
Filed Nov. 19, 1947      2 Sheets-Sheet 2
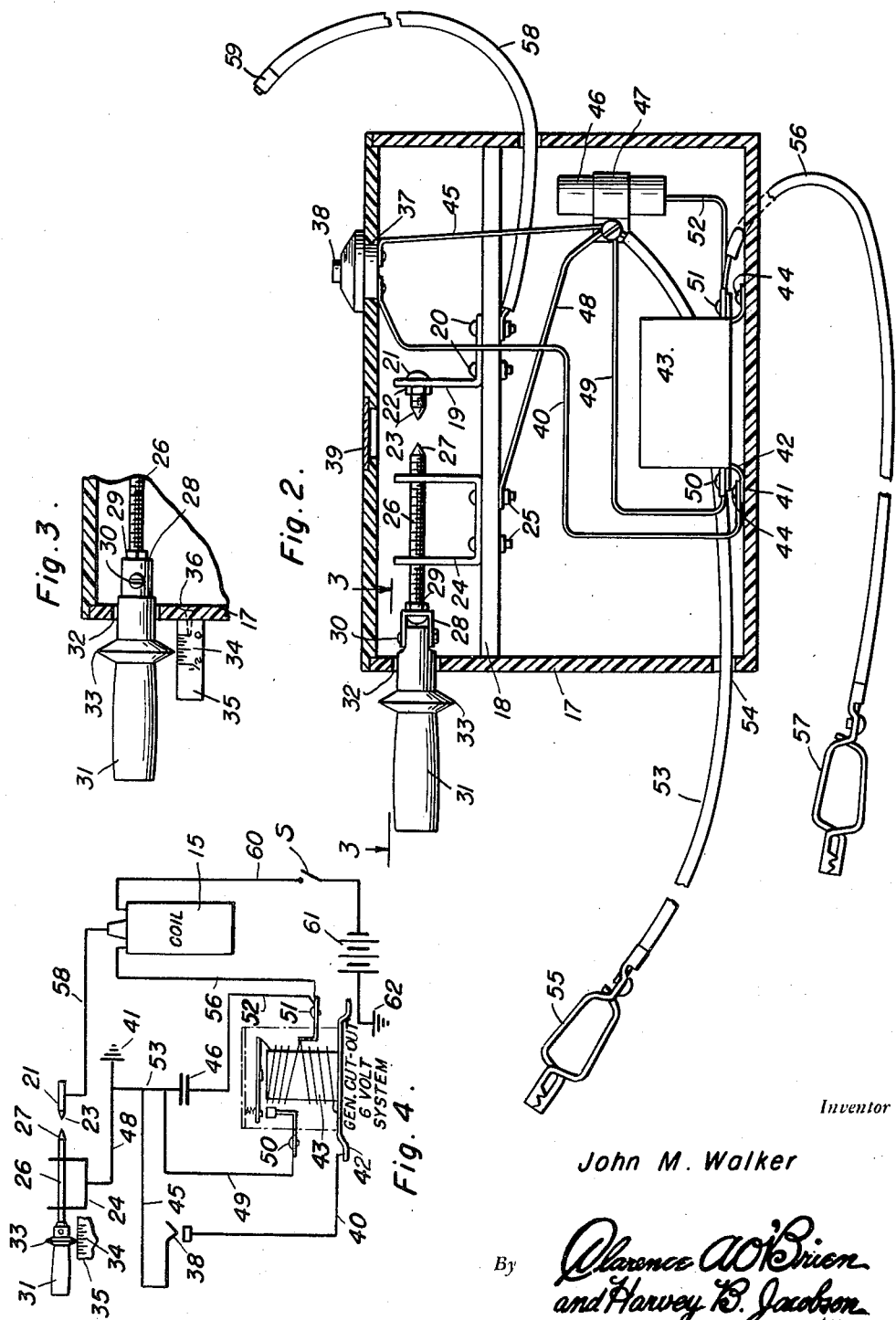
Inventor
John M. Walker Patented Mar. 28, 1950

2,501,802

UNITED STATES PATENT OFFICE 2,501,802

IGNITION COIL TESTER

John M. Walker, Mystic, Conn.

Application November 19, 1947, Serial No. 786,954

2 Claims. (Cl. 175—183)

The invention relates to ignition coil testers, and the object thereof is to provide a simple and inexpensive tester for testing the sparks produced by an ignition coil, either while installed in the automobile, or when taken out and placed on the work bench.

The present coil tester is designed so as to completely cut out the distributor condenser and points of a circuit and in turn measure the actual spark which the coil is capable of producing, the device including spark points, one of which is adjustable relative to the other and provided with means for indicating on a scale, the length of a spark gap and thus the length of the spark produced across the gap so as to indicate the condition of the coil which in efficient operation is ordinarily designed to produce a spark about $\frac{7}{16}$ of an inch in length.

Another object of the invention is to provide a coil tester which includes a cabinet or case provided with an adjustable spark gap capable of adjustment from the outside and a window through which the spark produced may be viewed, there being a switch in the form of a push button switch provided in the top of the cabinet to close the circuit through a conventional electromagnetically operated make and break device such as is ordinarily used as a generator cut out, and a condenser, the tester having three wire terminals one of which is provided for connection with the high tension side of the coil and the other two of which are provided with clamps one of which is adapted to be grounded to the frame of the automobile or engine and the other of which is adapted to be connected to the distributor side of the coil, whereby upon closing the switch to the various parts, sparks will be produced across the gap, which may be adjusted to test the length of the spark and thus the condition of the coil.

Another object of the invention is to provide a simple and inexpensive coil tester embodying several standard parts connected in a novel circuit and including a novel adjustable spark gap having means for reading the length of the spark readily on a scale, all of which are capable of construction for economical production and sale.

Other objects and advantages reside in the details of construction and operation as more fully hereinafter described and claimed, reference being had to the accompanying drawings forming part hereof, wherein like numerals refer to like parts throughout, and in which:

Figure 2 is an enlarged sectional view of the coil tester showing the interior construction and arrangement of wiring together with terminal wires for connection to the high tension side of the coil, also to the distributor side of the coil, and to ground, such as in connection with the frame or engine of the automobile;

Figure 3 is a horizontal sectional view taken on the line 3—3 of Figure 2, and

Figure 4 is a diagrammatic view of the circuit arrangement of the coil tester.

Figure 1:
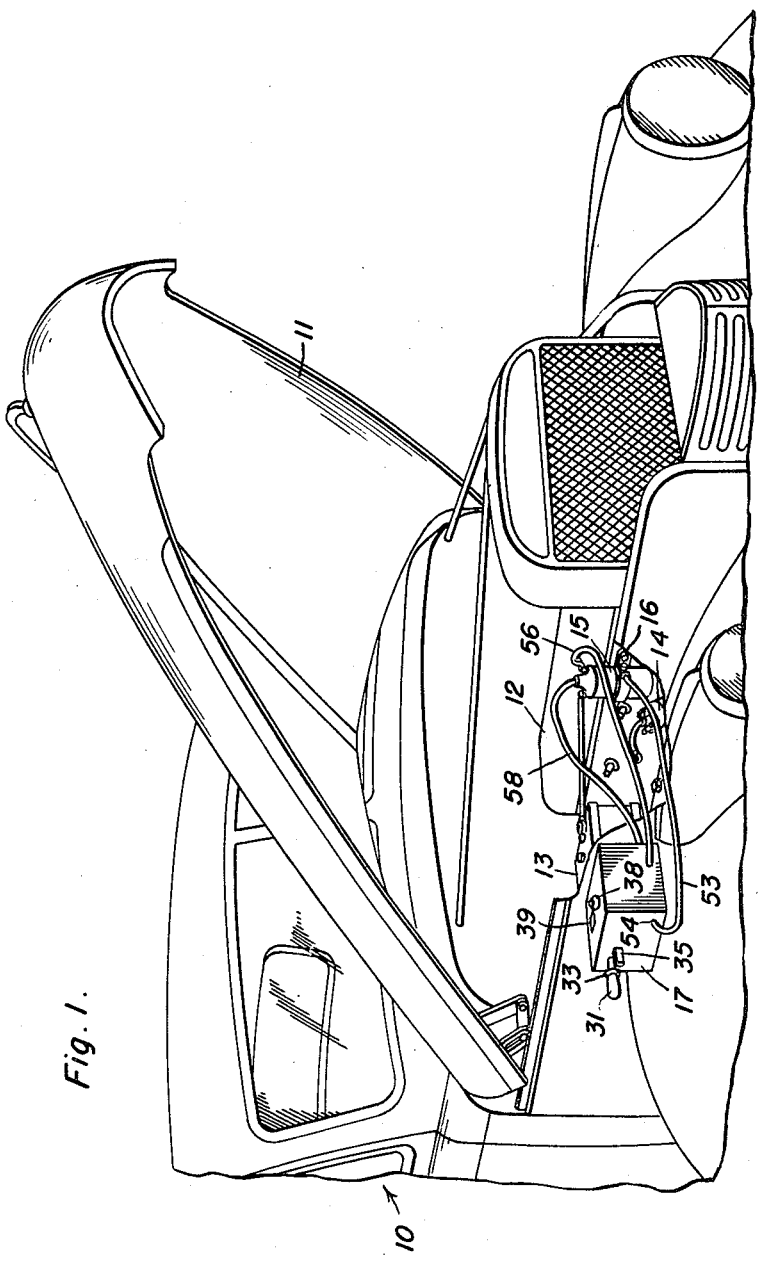
Figure 1 is a perspective view showing the coil tester in use in connection with the coil of an automobile ignition system.

Referring to the drawings in detail, there is shown in Figure 1, an automobile 10 of the usual construction arranged beneath the hood 11 of which is the engine 12, battery 13, distributor 14 and ignition coil 15 of conventional form shown mounted in a bracket 16. The tester includes a case or cabinet 17, shown rectangular in shape and of insulating material. Positioned horizontally across the cabinet is a horizontal shelf or partition 18 also of non-conducting material designed to support an adjustable spark gap construction and measuring device for measuring the length of the spark. This device includes an L-shaped bracket 19 the horizontal lower part, arm or foot portion of which is bolted to the shelf or partition 18 as indicated at 20 and the vertical portion of which is provided with a hole drilled through the metal and tapped to take a bolt or screw 21 held by the nut 22 and provided with a tapered point 23. A U-shaped bracket 24 is similarly bolted to the shelf or partition 18 at its lower connecting or bight portion, as indicated at 25 and the uprights or leg portions thereof are drilled through the metal and tapped to receive a screw 26 having a tapered point 27 cooperating with the point 23 and capable of adjustment toward and away from the same, to vary the spark gap therebetween. The head of the bolt or screw 26 is connected to the bight portion of a U-shaped attaching member 28 and held by a nut 29, the member 28 being bolted as indicated at 30 to the inner end of a handle or knob 31 of insulating material which extends through an opening 32 in one side wall of the case or cabinet 17 so as to permit adjustment of the point 27 relative to the point 23 by turning the handle. The handle 31 is provided with a peripheral flange tapered to a sharp edge as indicated at 33 to cooperate with a scale 34 calibrated in fractions of an inch and of one-half inch length provided on the top surface of a scale bar 35 secured by a screw 36 through the wall of the cabinet or case 17 at one side of the opening 32 to cooperate with the edge of the flange 33 to indicate the length of the gap between the points 23 and 27 and so that when said points are together, the flange is opposite the zero mark on the scale and may be adjusted up to one-half inch. This is usually sufficient, since the spark from a good coil should measure roughly $\frac{7}{16}$ of an inch in length.

Also provided in the cabinet at an opening 37 in the top thereof, is a switch, shown as a push button switch 38 and over the gap between the points 23 and 27, the top wall of the case or cabinet is provided with a transparent view window 39 in an opening therein, so that the condition and length of the spark between the points 23 and 27 may be viewed. One terminal of the switch 38 is connected by a conductor 40 to the ground terminal 41 of the frame 42 of a conventional electro-magnetically operated make and break device 43, such as is commonly used as a generator cut-out, and which is supported upon the bottom of the case and attached thereto as indicated at 44. The other terminal of the switch 38 is connected by a conductor or wire 45 to a terminal of a condenser 46 which is also connected adjacent thereto on a supporting bracket 47 thereof, by a wire or conductor 48 to the supporting bracket 24 at one of the bolt terminals 25. Another wire 49 also connects this terminal of the condenser to the battery side or terminal 50 of the make and break device 43 whose contacts are set at a normal clearance of .012 inch. The other terminal of the make and break device, indicated at 51 is connected by a conductor wire 52 to the other terminal of condenser 46 and a cable 53 leads from the first terminal of the condenser through an opening 54 in one side of the case or cabinet 17 and has a clamp 55 at its free end, for connection to ground through the frame of the automobile or engine at a suitable point. A cable 56 also leads from the second terminal of the make and break device 43 through another opening in the case or cabinet 17 at one side and is provided at its free end with a clamp 57 for connection to the distributor side of the coil 15 as shown in Figure 1 of the drawings. An additional cable 58 leads from one of the bolts 20 acting as a terminal connected to the bracket 19 of point 23, in the same manner that the wire 48 is connected to the bracket 24 and point 27, and the free end of cable 58 is provided with a terminal 59 for insertion in the high tension side or socket of the coil 15 also as shown in Figure 1 of the drawings. The distributor side of the coil is connected as usual by a wire 60 through ignition switch S to the ordinary battery 61 of the automobile which is grounded as indicated at 62. By turning the handle 31, the points 23 and 27 through adjustment of the latter point in the bracket 24 by means of the screw 26, are adjusted so that the gap may be up to one-half inch length but when the points are set together, the pointer or flange 33 indicates zero on the scale 34. The make and break device acts in the same capacity as the mechanically actuated points of a distributor and, as previously stated, its contacts are set to .012 of an inch. The condenser serves the same purpose as the condenser in the distributor 14 and the push button or switch 38 serves to make and break the circuit through the tester. The indicator or flange 33 indicates on the scale the exact length of the spark and the strength of the coil being tested is directly proportional to the length of the sparks attained. The sparks from a good coil ordinarily roughly measuring at $\frac{7}{16}$ of an inch in length.

In the use of the device, the small wire leading from the coil to the distributor as ordinarily connected in the motor is disconnected and the wire cable 56 having the clamp 57 at its end, and constituting the small wire of the ignition coil tester is connected to the distributor side of the coil 15. The wire or cable 53 with the terminal 55 is connected to ground on any place of the frame or engine of the machine or automobile. The large wire or cable 58 with the terminal 59, usually a red wire, is connected to the high tension side of the coil 15 by insertion in the top or socket thereof for electrical connection at the metallic terminal 59. The ignition switch S of the automobile is then turned to an on position and the ignition coil tester is now connected and ready for operation. The switch 38 on the top of the case or cabinet of the testing device is then operated to close the testing circuit and if a steady stream of sparks is not seen through the small view window 39 in the spark gap between the points 23 and 27 of the screws 21 and 26, the knob or handle 31 is turned in one direction to adjust the screw 26 and the point 27 in closer relation to the point 23, until a steady stream of sparks is seen. The gap is then adjusted to a greater distance by the handle 31 to separate the point 27 from the point 23 by turning the knob or handle in the opposite direction until the longest possible steady stream of sparks is attained. At this point, the indicator or flange 33 will indicate on the scale 34 the length of the spark, and thus the condition of the coil 15 and quality of the spark which may be viewed through the window 39 to ascertain whether or not the spark coil is in good condition or whether or not it needs replacement or renewal. The tester provides three circuits. In operation, current flows from the battery 61 through the ignition switch S to one side of the primary winding of ignition coil 15 by way of wire 60, and then through wire 56 to one side of the magnet windings of make and break device 43, frame 42 of said make and break device, and conductor 40 to the fixed contact of switch 38. When switch 38 is closed, the current flows through wires 45 and 53 to the ground connection 41 with the engine or frame of the automobile, and then through ground connection 62 back to the battery, thus completing one circuit. The current flowing through this circuit causes the movable contact of make and break device 43 to engage its fixed contact and close a second circuit. In the second circuit, the current flows from the magnet windings of device 43 through the contacts of the latter, wires 49 and 53, and grounds 41 and 62 back to the battery. As this second circuit is of less resistance than the first circuit, the magnetic field of device 43 breaks down, and the movable contact of the latter disengages from the fixed contact thereof to open the second circuit. By holding switch 38 closed, the movable contact of device 43 is caused to vibrate and thereby rapidly open and close the second circuit, thereby causing the magnetic field within coil 15 to build up and break down each time the movable contact of device 43 engages and disengages the fixed contact thereof. Each time the magnetic field of coil 15 breaks down, a high tension current is induced in the secondary winding of coil 15, and such high tension current flows through wire 58 to point 21, across the gap to point 27, through wires 48 and 53, and back to the battery by way of grounds 41 and 62, thus completing the third circuit. The purpose of condenser 46 is to aid rapid breaking down of the magnetic field and to prevent arcing at the contacts of device 43. The device is small, making it easily carried out to any job and it is not necessary to take the coil out of the car for testing, thus saving time. However, the coil may be tested on a bench substituting any suitable battery and proper connections as stated. It is of simple construction and can be produced at a low cost, in addition to being simple to use and effective for the purposes stated.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An ignition coil tester comprising a conventional electro-magnetically operated make and break device having a frame and including a fixed contact, a movable contact, and an electromagnet having a winding connected at one side to said frame and a second winding connected at one side to said movable contact; said movable contact being normally yieldingly disengaged from said fixed contact and being attractable into engagement with the latter by the magnet when the latter is energized; a wire connected at one end to the other sides of said windings and having quick detachable means at its other end to connect the same to one side of the primary winding of the coil to be tested, spaced points providing a spark gap therebetween, one of said points being adjustable relative to the other to vary said gap, a wire connected at one end to one of said points and having quick detachable means at its other end to connect the same to the high tension terminal of the coil to be tested, a third wire having quick detachable means at one end to connect the same to the engine or frame of an automobile; a manually operable switch having coacting contacts; conductors connecting the other end of said third wire to the adjustable point, to the fixed contact of said make and break device, and to one contact of said switch; and a conductor connecting the other contact of said switch to the frame of the make and break device.

2. The construction defined in claim 1, in combination with a casing containing said points and said make and break device and having a window in a wall thereof through which the gap between the points may be viewed, said switch being mounted in a wall of said casing, the adjustable point having an operating handle projecting outwardly through a wall of said casing.

JOHN M. WALKER.

REFERENCES CITED

The following references are of record in the file of this patent:

UNITED STATES PATENTS

| Number | Name | Date |
|---|---|---|
| 1,765,479 | Benson | June 24, 1930 |
| 2,112,638 | Travis | Mar. 29, 1938 |